US012393144B2

(12) United States Patent
Tsuruya

(10) Patent No.: US 12,393,144 B2
(45) Date of Patent: Aug. 19, 2025

(54) FIXING UNIT AND IMAGE FORMING APPARATUS

(71) Applicant: Canon Kabushiki Kaisha, Tokyo (JP)

(72) Inventor: Takaaki Tsuruya, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/393,830

(22) Filed: Dec. 22, 2023

(65) Prior Publication Data

US 2024/0210861 A1 Jun. 27, 2024

(30) Foreign Application Priority Data

Dec. 27, 2022 (JP) ................................ 2022-210817

(51) Int. Cl.
*G03G 15/20* (2006.01)

(52) U.S. Cl.
CPC ..... *G03G 15/2053* (2013.01); *G03G 15/2017* (2013.01); *G03G 15/2064* (2013.01)

(58) Field of Classification Search
CPC ........... G03G 15/2017; G03G 15/2053; G03G 15/2064
See application file for complete search history.

(56) References Cited

U.S. PATENT DOCUMENTS

| | | | | |
|---|---|---|---|---|
| 8,639,170 | B2 | 1/2014 | Yonekawa et al. | |
| 9,618,889 | B2 | 4/2017 | Nishizawa et al. | |
| 2012/0251205 | A1* | 10/2012 | Nakao | G03G 15/2053 399/329 |
| 2014/0286683 | A1 | 9/2014 | Nakamura | |

FOREIGN PATENT DOCUMENTS

| | | | |
|---|---|---|---|
| JP | 2004070191 | A | 3/2004 |
| JP | 2004184446 | A | 7/2004 |
| JP | 2011253085 | A | 12/2011 |
| JP | 2014026267 | A | 2/2014 |

OTHER PUBLICATIONS

Extended European Search Report dated May 23, 2024 in counterpart European Patent Appln. No. 23219145.2.

* cited by examiner

*Primary Examiner* — Hoang X Ngo
(74) *Attorney, Agent, or Firm* — Venable LLP

(57) ABSTRACT

A fixing unit includes a tubular film including a heat generating layer, a nip forming member including a sliding surface configured to be in sliding contact with an inner surface of the film, a heat generation mechanism configured to cause the film to generate heat, and a pressing member that is configured to be in contact with an outer surface of the film. The film includes a heat generating layer, an inner layer formed on an inner circumference side of the heat generating layer, and an outer layer formed on an outer circumference side of the heat generating layer. The sliding surface of the nip forming member includes a protruded portion that is protruded toward the pressing member in a third direction. A neutral axis of the film is positioned within the outer layer.

11 Claims, 18 Drawing Sheets

CONDITION A

CONDITION B

CONDITION C

EMBODIMENT (#3)

COMPARATIVE EXAMPLE (#5)

FIXING UNIT AND IMAGE FORMING APPARATUS

BACKGROUND OF THE INVENTION

Field of the Invention

The present invention relates to a fixing unit for fixing images on recording materials, and to an image forming apparatus for forming images on recording materials.

Description of the Related Art

A known configuration of a fixing unit for fixing images on recording materials in an image forming apparatus adopts a film having a heat generating layer, wherein a current is supplied to the heat generating layer to generate Joule heat and heat the film. Japanese Patent Application Laid-Open Publication No. 2011-253085 discloses supplying a current to the heat generating layer through a power feeding brush that is in contact with an end portion of a film, i.e., fixing belt. Japanese Patent Application Laid-Open Publication No. 2014-026267 discloses generating an alternating magnetic field by supplying an alternating current to a coil inserted to an inner space of a film, and causing a circulating current to flow through the heat generating layer based on the principle of electromagnetic induction.

However, if there is an area within a rotation track of the film where the film is bent with a large curvature, bending fatigue of the heat generating layer caused by bending deformation may occur. If cracking or permanent deformation of the heat generating layer occurs by the bending fatigue when the film has been used for a long period of time, electric resistance of the heat generating layer may rise, which may cause the heating value to drop and cause image fixing failures.

SUMMARY OF THE INVENTION

The present disclosure provides a fixing unit and an image forming apparatus having a film that is capable of exerting a stable performance for a long period of time.

According to one aspect of the invention, a fixing unit includes a tubular film including a heat generating layer and extending in a longitudinal direction f the film, a nip forming member including a sliding surface configured to be in sliding contact with an inner surface of the film, a heat generation mechanism configured to cause the film to generate heat, and a pressing member that is configured to be in contact with an outer surface of the film, and that is arranged to sandwich the film together with the nip forming member to form a nip portion between the film and the pressing member, wherein the film includes a heat generating layer configured to generate heat in a case where an electric current is passed in a circumferential direction of the film by the heat generation mechanism, an inner layer formed on an inner circumference side of the heat generating layer, and an outer layer formed on an outer circumference side of the heat generating layer, wherein, in a case where the longitudinal direction is referred to as a first direction, a recording material conveyance direction at the nip portion is referred to as a second direction, and a direction orthogonal to both the first direction and the second direction is referred to as a third direction, the sliding surface of the nip forming member includes a protruded portion that is protruded toward the pressing member in the third direction, and the sliding surface is formed such that a curvature of the film when viewed in the first direction is maximum at a contact portion between the film and the protruded portion, and wherein as seen in the first direction, a neutral axis of the film is positioned within the outer layer.

Further features of the present invention will become apparent from the following description of exemplary embodiments with reference to the attached drawings.

DESCRIPTION OF THE EMBODIMENTS

A preferred embodiment according to the present disclosure will be described below with reference to the drawings.

In the present disclosure, an "image forming apparatus" refers, not only to a single-function printer having only a printing function, but also to a wide variety of apparatuses for forming images on recording materials, such as a copying machine having a copying function, a multifunction machine having multiple functions, and a commercial large-scale printer.

Further, in the present disclosure, a "fixing unit" includes a wide variety of apparatuses, such as an image heating apparatus, for heating the image formed on the recording material through an electrophotographic process and fixing the image on the recording material. The fixing unit may also be a device arranged to heat the image that has already been fixed, i.e., primarily fixed, to the recording material in order to apply glossiness thereto.

1. Image Forming Apparatus

Figure 1:
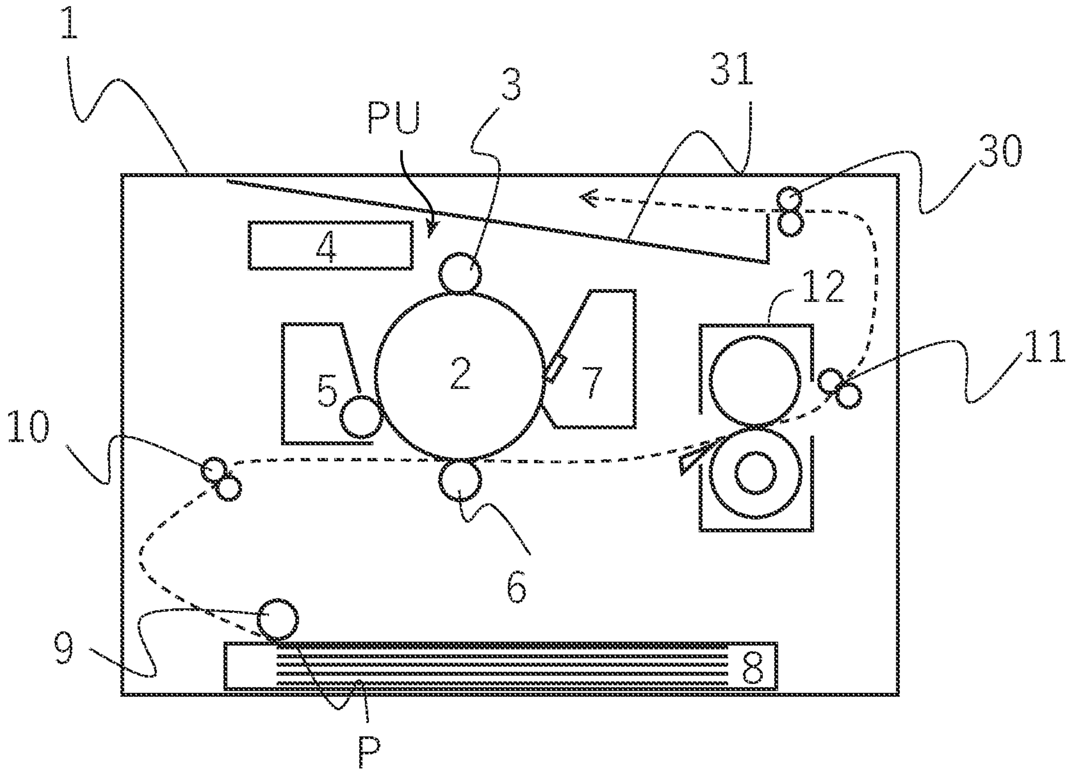
FIG. 1 is a schematic diagram of an image forming apparatus according to an embodiment.

An overall configuration of an image forming apparatus according to an embodiment of the present disclosure will be described with reference to FIG. 1. FIG. 1 is a cross-sectional view illustrating a schematic configuration of a laser beam printer, hereinafter referred to as printer 1, serving as an example of an image forming apparatus. The printer 1 executes an image forming operation for forming an image on a recording material P based on an image information received from an external apparatus, such as a personal computer. Various sheet materials of various sizes and materials may be used as the recording material P, i.e., recording medium, such as paper including normal paper and thick paper, sheet materials such as a coated paper having a surface treatment applied thereto, sheet materials such as an envelope or an index paper having a special shape, plastic films, and cloths.

The printer 1 includes a process unit PU serving as an image forming unit or an image forming portion that forms an image on the recording material P by an electrophotographic process, and a fixing unit 12 for fixing the image on the recording material P.

The process unit PU includes a photosensitive drum 2 serving as an image bearing member, a charging roller 3 serving as a charging unit or a charging portion, a laser scanner unit 4 serving as an exposing unit or an exposing portion, and a developing unit 5 serving as a developing unit or a developing portion. Further, the process unit PU includes a transfer roller 6 serving as a transfer unit or a transfer portion, and a cleaning blade 7 serving as a cleaning unit or a cleaning portion. The photosensitive drum 2 is a photosensitive member that is formed in a cylindrical shape. The developing unit 5 is equipped with a container for storing toner serving as developer, and a developing roller for bearing and supplying toner to the photosensitive drum 2.

In the image forming operation, the photosensitive drum 2 is driven to rotate, and the charging roller 3 charges the surface of the photosensitive drum 2 uniformly. The laser scanner unit 4 irradiates the photosensitive drum 2 with laser light to expose the photosensitive drum 2 based on a digital image signal generated according to the image information being entered by the image processing unit equipped in the printer 1, and an electrostatic latent image corresponding to the image information is formed on the surface of the photosensitive drum 2. The developing unit 5 supplies toner to the photosensitive drum 2 and develops the electrostatic latent image as a toner image.

Simultaneously with the creation of the toner image, the conveyance of the recording material P is performed. A cassette 8 is stored in a lower portion of the printer 1 in a manner capable of being drawn out therefrom. The recording material P is stored in a stacked manner in the cassette 8. The recording material P stored in the cassette 8 is fed one sheet at a time by a feed roller 9 serving as a feeding unit or feeding portion, and conveyed to a transfer portion by a conveyance roller pair 10.

The transfer roller 6 transfers the toner image from the photosensitive drum 2 to the recording material P at a transfer portion between the photosensitive drum 2 and the transfer roller 6. Foreign substances such as transfer residual toner remaining on the photosensitive drum 2 without being transferred to the recording material P is removed by the cleaning blade 7.

The recording material P having passed through the transfer portion is transferred to the fixing unit 12. The fixing unit 12 heats and presses the image on the recording material P while conveying the recording material P to thereby fix the image on the recording material P. The details of the fixing unit 12 will be described later. The recording material P having passed through the fixing unit 12 is conveyed via a conveyance roller pair 11 to a sheet discharge roller pair 30, and discharged by the sheet discharge roller pair 30 onto a sheet discharge tray 31.

In the present embodiment, a direct transfer-type image forming unit, i.e., image forming portion, has been descried, but it is also possible to use an intermediate transfer-type image forming unit, i.e., image forming portion, in which a toner image is primarily transferred from an image bearing member to an intermediate transfer body such as an intermediate transfer belt, and then secondarily transferred from the intermediate transfer body to the recording material. Further, the image forming unit, or image forming portion, may form a color image using a plurality of colored toners.

2. Fixing Unit

Figure 2:
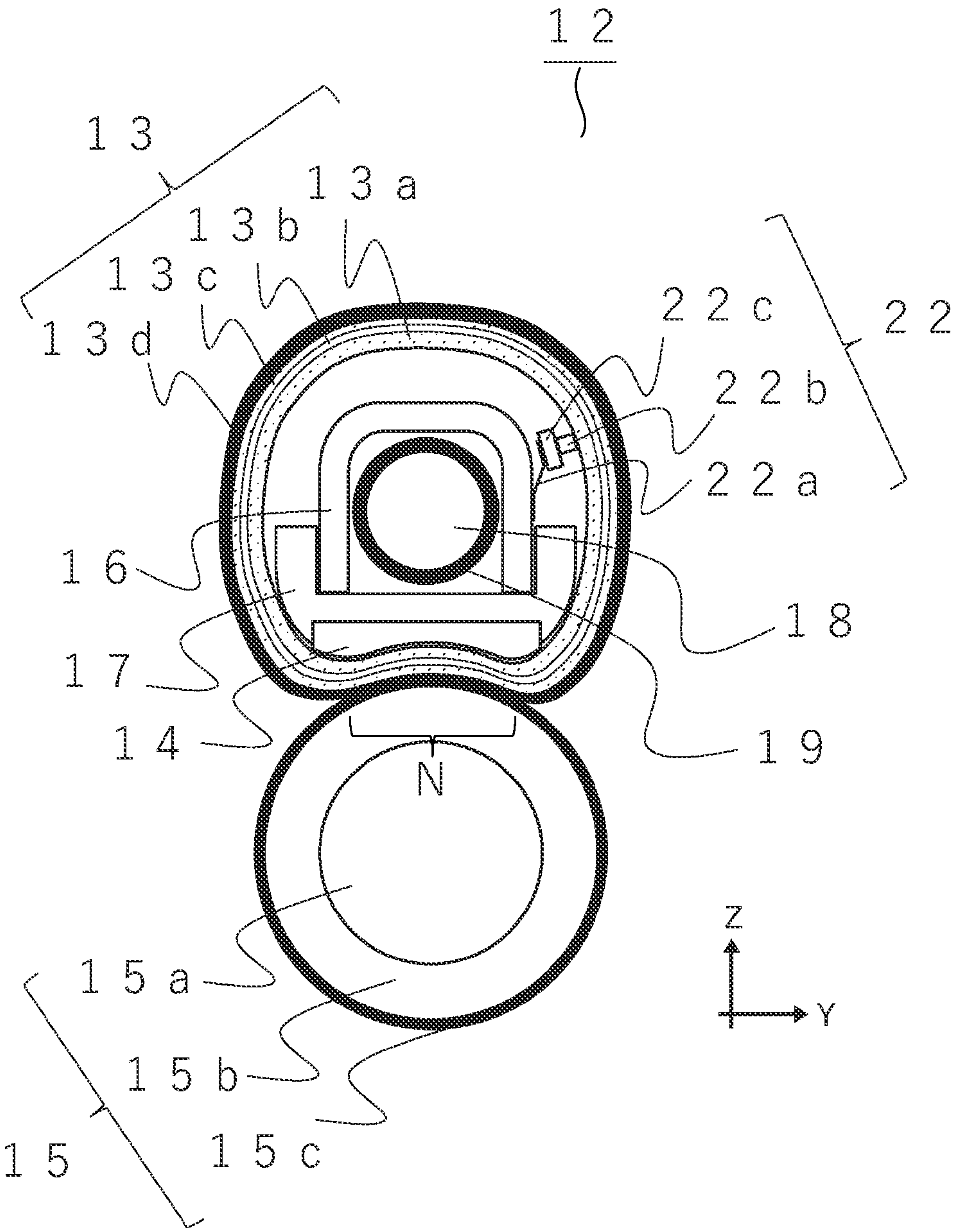
FIG. 2 is a cross-sectional view of a fixing unit according to the embodiment.

The fixing unit 12 will be explained. The fixing unit 12 according to the present embodiment is an induction heating-type fixing unit. FIG. 2 is a cross-sectional view of the fixing unit 12, and FIG. 3 is a perspective view of the fixing unit 12.

Figure 3:
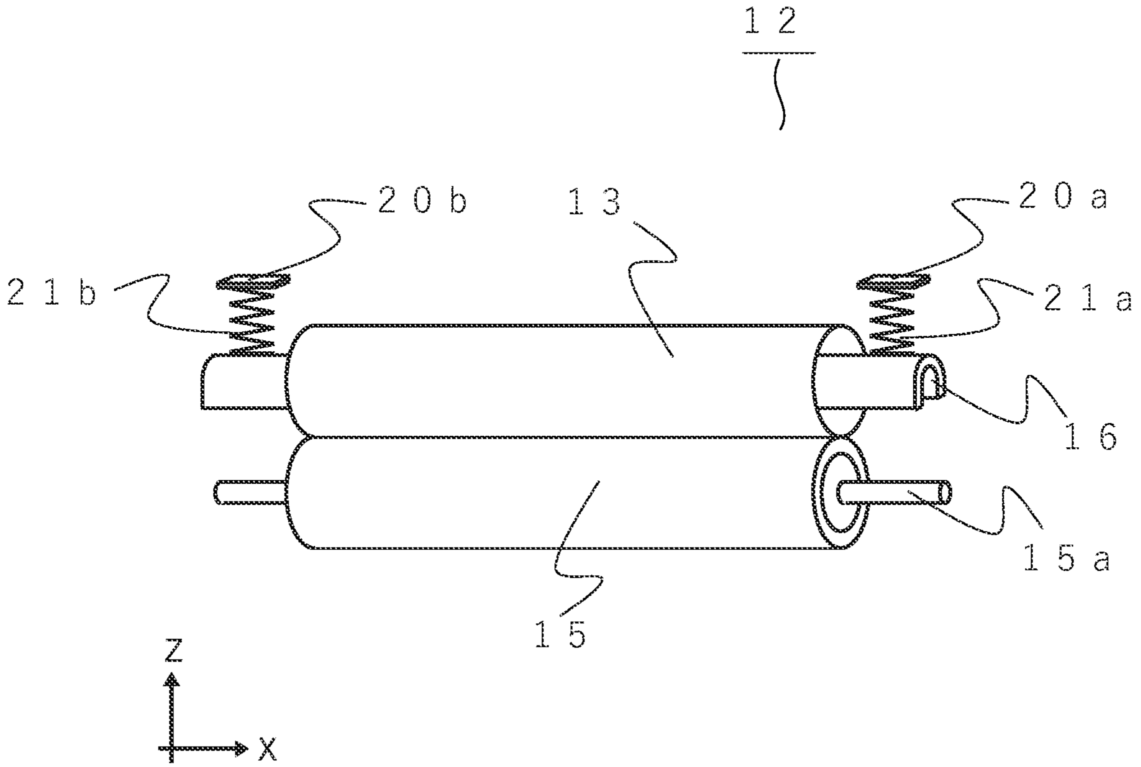
FIG. 3 is a perspective view of the fixing unit according to the embodiment.

As illustrated in FIGS. 2 and 3, the fixing unit 12 includes a fixing film 13, a sliding member 14, a pressing roller 15, a stay 16, a holder 17, a magnetic core 18, an exciting coil 19, and a temperature sensor 22.

The fixing film 13 is formed of a tubular, or endless, film having flexibility. The fixing film 13 is an example of a heating member, i.e., rotating heating body, that heats the image on the recording material. The sliding member 14 is an example of a nip forming member that is in sliding contact with an inner surface of the fixing film 13. The pressing roller 15 is an example of a pressing member that is abutted against the sliding member 14 interposing the fixing film 13 and that forms a nip portion N, i.e., fixing nip, with the sliding member 14.

The exciting coil 19 and the magnetic core 18 are an example of a heat generation mechanism that supplies current to a heat generating layer 13*b* of the fixing film 13 and causes the heat generating layer 13*b* to generate heat. The exciting coil 19 and the magnetic core 18 serving as the heat generation mechanism according to the present embodiment generates an alternating magnetic field by having an alternating current supplied thereto, and functions as a magnetic field generation portion or magnetic field generation unit that induces a current flowing in a circumferential direction inside the heat generating layer 13*b* by the alternating magnetic field.

The holder 17 retains the sliding member 14 at a position opposed to the pressing roller 15 interposing the fixing film 13. Further, the holder 17 has a function to be in contact with the inner surface of the fixing film 13 at an outer side of the nip portion N and to guide a rotation track of the fixing film 13. The stay 16 is a metal member that enhances a stiffness of the fixing unit 12. The temperature sensor 22 is a sensor that detects a temperature of the fixing film 13.

The fixing unit 12 heats the fixing film 13 by passing an electric current through the exciting coil 19, and heats the image on the recording material P by the fixing film 13 while nipping and conveying the recording material P by the fixing film 13 and the pressing roller 15 at the nip portion N.

In the following description and drawings, a bus line direction, i.e., longitudinal direction, of the fixing film 13 is referred to as a longitudinal direction X of the fixing unit 12, or the longitudinal direction X. A direction of movement of the recording material P at the nip portion N is referred to as a recording material conveyance direction Y. The recording material conveyance direction Y is a direction orthogonal to the longitudinal direction X, and it is a direction in which the surface of the fixing film 13 and the pressing roller 15 move at the nip portion N. The direction orthogonal to both the longitudinal direction X and the recording material conveyance direction Y is referred to as a perpendicular direction Z.

The longitudinal direction X is an example of a first direction. The recording material conveyance direction Y is an example of a second direction. The perpendicular direction Z is an example of a third direction.

The fixing film 13 adopts a layer structure including a base layer 13*a*, the heat generating layer 13*b*, a protective layer 13*c*, and a surface layer 13*d*. The base layer 13*a*, the heat generating layer 13*b*, the protective layer 13*c*, and the surface layer 13*d* are laminated in the named order from an inner circumference side toward an outer circumference side in a thickness direction of the fixing film 13. The base layer 13*a* is an example of an inner layer formed of synthetic resin on an inner circumference side of the heat generating layer 13*b*. The protective layer 13*c* is an example of an outer layer formed of synthetic resin on an outer circumference side of the heat generating layer 13*b*. The surface layer 13*d* is a layer, i.e., release layer, formed on an outermost circumference side of the fixing film 13.

The base layer 13*a* desirably has a higher electrical resistivity than the heat generating layer 13*b* and a heat resisting property. The material of the base layer 13*a* is preferably an insulator, and for example, itis preferably an insulative heat-resistant resin such as polyimide, polyamide imide, polyether ether ketone (PEEK), and polyethersulfone (PES). The base layer 13*a* according to the present embodiment is a polyimide having an inner diameter of 30 mm, a length of 240 mm in the longitudinal direction X, and a thickness of approximately 40 μm.

The heat generating layer 13*b* is a layer of heating resistor that generates Joule heat in a case where an electric current is passed therethrough. The heat generating layer 13*b* is formed of a material having a lower electrical resistivity than the base layer 13*a* and the protective layer 13*c*. The material of the heat generating layer 13*b* is preferably a simple metal such as iron, copper, silver, aluminum, nickel, chromium, and tungsten, or an alloy having a low volume resistivity such as stainless steel (SUS304) and nichrome containing such simple metals. If the volume resistivity is sufficiently low, a conductive resin such as carbon fiber reinforced plastic (CFRP) and carbon nanotube resin may be used to form the heat generating layer 13*b*. The heat generating layer 13*b* may be formed by a known method, such as coating, plating sputtering and vapor deposition. The base layer 13*a*, the protective layer 13*c*, the surface layer 13*d*, and an elastic layer described later, other than the heat generating layer 13*b* may also be formed by a known film manufacturing method such as dipping spray-coating and inflation molding. The heat generating layer 13*b* according to the present embodiment is formed by plating copper through electroplating to a thickness of approximately 1 μm.

The protective layer 13*c* preferably has a higher electrical resistivity than the heat generating layer 13*b* and a higher heat resisting property. The material of the protective layer 13*c* is preferably an insulator, and for example, it is preferably an insulative heat-resistant resin such as polyimide, polyamide imide, polyether ether ketone (PEEK), and polyethersulfone (PES). The protective layer 13*c* may be formed of a same material as the base layer 13*a*. The protective layer 13*c* according to the present embodiment is formed of the same polyimide as the base layer 13*a*, and has a thickness of approximately 47 μm.

In the present embodiment, a position of a neutral axis of the fixing film 13 may be adjusted by adjusting the thickness of the protective layer 13*c* or other layers. The neutral axis of the fixing film 13 is a line of intersection where a surface, i.e., neutral plane, where distortion does not occur to the fixing film 13 when bending deformation deforming the cross-sectional shape viewed in the longitudinal direction X of the fixing film 13 occurs thereto intersects a virtual plane perpendicular to the longitudinal direction X. In the description, the term bending deformation refers to a deformation wherein the inner circumference surface of the fixing film 13 is compressed in the circumferential direction and the outer circumference surface of the fixing film 13 is elongated in the circumferential direction when viewed in the longitudinal direction X. The position of the neutral axis of the fixing film 13 may be computed based on a thickness and an elastic modulus of each layer of the fixing film 13.

The surface layer 13*d* is preferably formed of a material having a high release property to toner and has a high heat resisting property. The surface layer 13*d* is preferably formed of a material having a good release property and heat resisting property, such as a fluororesin such as PFA, PTFE, and FEP. PFA is an abbreviation of tetrafluoroethylene-perfluorcalkylvinyl ether copolymer, PTFE is an abbreviation of polytetrafluoroethylene, and FEP is an abbreviation of tetrafluoroethylene-hexafluoropropylene copolymer. The surface layer 13*d* according to the present embodiment is an PFA resin tube having a thickness of approximately 30 μm.

According to the present embodiment, a configuration is described in which the surface layer 13*d* and the protective layer 13*c*, i.e., an outer circumference side layer of the heat generating layer 13*b*, or outer layer, are arranged adjacent to each other, but it is also possible to provide an elastic layer formed of an elastic material such as sponge or rubber between the surface layer 13*d* and the protective layer 13*c*. By providing the elastic layer, the surface layer 13*d* is made to follow the unevenness of the surface of the recording material and have a higher adhesiveness to the toner image, such that heating unevenness of the recording material and the toner image is reduced, and an image having a small unevenness of glossiness may be achieved. Further, a primer layer may be disposed with the aim to enhance the adhesiveness between the respective layers. Moreover, a layer constituting the inner surface of the fixing film 13 may be provided on the inner circumference side of the base layer 13*a*.

The sliding member 14 preferably has a superior sliding contact property with the inner surface of the fixing film 13 and a heat resisting property. The sliding member 14 according to the present embodiment is composed of a base material in which a surface layer is provided on a surface being in sliding contact with the fixing film 13. The base material is preferably a heat-resistant resin such as polyimide, polyamide imide, PEEK, and PES having superior heat resisting property, or a metal such as aluminum and steel. In the present embodiment, a pure aluminum having a thickness of 0.8 mm is adopted as a base material. A surface layer of the present embodiment is a PTFE coating with a thickness of approximately 30 μm that has a low sliding fiction against the inner surface of the fixing film 13 and has superior heat resisting property and abrasion resistance. Further, a lubricant having a heat resisting property is disposed between the sliding member 14 and the fixing film 13 to further reduce the sliding fiction therebetween. A fluorine-based or silicone-based grease or oil is preferable as the lubricant. In the present embodiment, a fluorine grease containing fluorine oil as base and PTFE as thickener is used as the lubricant.

The sliding member 14 is retained by the holder 17. The holder 17 includes a groove portion, i.e., recess portion, on the pressing roller 15 side in the perpendicular direction Z to which the sliding member 14 is fit. Further, the surface of the holder 17 opposite to the surface having the sliding member 14 in the perpendicular direction Z is supported by the stay 16. The stay 16 is a metal member having a U-shaped cross section. The sliding member 14, the holder 17, and the stay 16 are each a member that is inserted to an inner space of the fixing film 13 and elongated in the longitudinal direction X.

The pressing roller 15 is a roller having an outer diameter of 30 mm including a core metal 15*a*, an elastic layer 15*b* that is coated concentrically to an outer circumference side of the core metal 15*a*, and a surface layer 15*c* serving as a surface layer. The elastic layer 15*b* is desirably formed of a material having a good heat resisting property, and for example, it is preferably formed of silicone rubber, fluororubber, or fluorosilicone rubber. The elastic layer 15*b* according to the present embodiment is a silicone rubber having a thickness of approximately 4 mm. The surface layer 15*c* is preferably formed of a material having good release property and heat resisting property, and fluororesin such as PFA, PTFE, and FEP are preferable. The surface layer 15*c* according to the present embodiment is a PFA resin having a thickness of approximately 50 μm. Both end portions of the core metal 15*a* are retained rotatably by conductive bearings that are attached to side panels which constitute a portion of the frame body of the fixing unit 12.

Pressurizing springs 21*a* and 21*b* are respectively arranged between both end portions of the stay 16 and spring receiving members 20*a* and 20*b* disposed on the frame body of the fixing unit 12 (FIG. 3). The stay 16, the holder 17, and the sliding member 14 are urged toward the pressing roller 15 in the perpendicular direction Z by urging force of the pressurizing springs 21*a* and 21*b*. In the present embodiment, a pressing force of a total pressure of approximately 100 N to 500 N, i.e., approximately 10 kgf to approximately 50 kgf is applied to the stay 16. Thereby, the sliding member 14 and the pressing roller 15 are abutted against one another while sandwiching the fixing film 13 in between, and the nip portion N between the fixing film 13 and the pressing roller 15 is formed.

By receiving input of driving force from a motor serving as a driving source, the pressing roller 15 is driven to rotate in a direction of rotation along the recording material conveyance direction Y, i.e., clockwise direction of FIG. 2. The fixing film 13 rotates in a counterclockwise direction of FIG. 2 following the movement of the pressing roller 15 by fictional force received from the pressing roller 15 at the nip portion N.

The magnetic core 18 and the exciting coil 19 are arranged in a space surrounded by the stay 16 having a U-shaped cross-sectional shape and the holder 17. That is, the magnetic core 18 and the exciting coil 19, i.e., magnetic field generation portion or magnetic field generation unit, serving as a heat generation mechanism according to the present embodiment is passed through the inner space of the fixing film 13.

Figure 4:
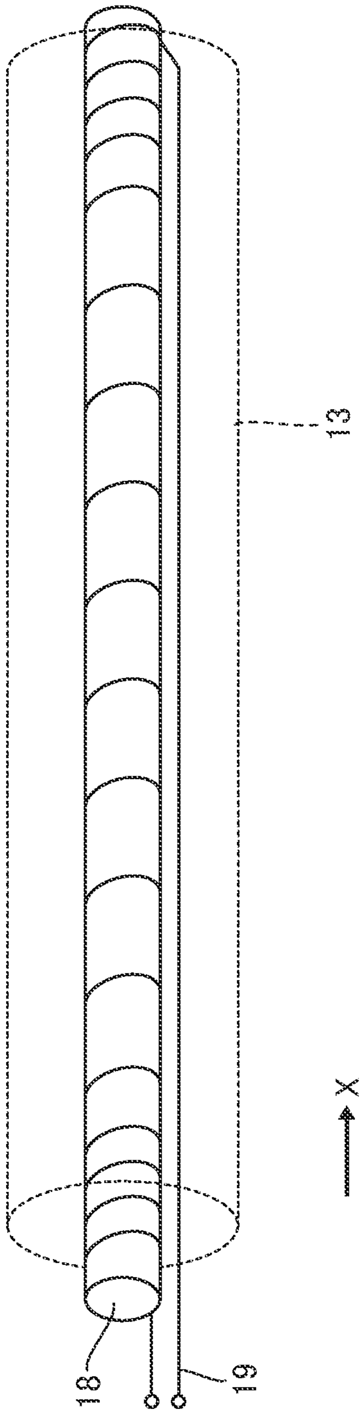
FIG. 4 is a perspective view of an exciting coil and a magnetic core according to the embodiment.

FIG. 4 is a perspective view illustrating the magnetic core 18 and the exciting coil 19 in schematic diagram. As illustrated in FIG. 4, the exciting coil 19 is formed in a helical shape that extends along the longitudinal direction X, i.e., first direction. The exciting coil 19 according to the present embodiment is wound around an outer circumference of the magnetic core 18. The magnetic core 18 has a columnar shape with end portions, and it is arranged approximately at a center, i.e., face center, of the fixing film 13 when viewed in the longitudinal direction X.

The magnetic core 18 has a function as a magnetic path forming member that induces lines of magnetic force, i.e., magnetic flux, of alternating magnetic field generated by the exciting coil 19 and forms a path, i.e., magnetic path, of the lines of magnetic force. The material of the magnetic core 18 is a magnetic body, and especially, a material having a small iron loss, i.e., hysteresis loss and eddy current loss, and a high relative permeability, such as a ferromagnetic body having a high permeability such as sintered ferrite or a ferrite resin, is preferred. The cross-sectional shape of the magnetic core 18 may be any shape that may be accommodated in a hollow portion of the fixing film 13, and the shape preferably has a cross-sectional area that is as large as possible. The cross-sectional shape of the magnetic core 18 is not necessarily round, but it is preferably dose to a round shape, since the copper loss, i.e., coil current Joule loss, may be reduced if the length of a wire, i.e., winding wire, when winding the exciting coil 19 around the magnetic core 18 is shot. The magnetic core 18 of the present embodiment is a ferrite that has a round cross-sectional shape with a diameter of 10 mm, and a length of 280 mm.

The exciting coil 19 is formed by winding a copper wire rod, i.e., single lead wire, having a diameter of 1 to 2 mm that is coated with a polyamide imide having a heat resisting property around the magnetic core 18 in a helical shape. The number of turns is 24. A direction of a helical axis of the exciting coil 19 is a direction parallel to the axial direction of the magnetic core 18 and the bus line direction of the fixing film 13, that is, the longitudinal direction X. When a high-frequency current is supplied to the exciting coil 19, induced current flows to the heat generating layer 13*b* by the principle described below, and the heat generating layer 13*b* generates heat.

As illustrated in FIG. 2, the temperature of the fixing film 13 is detected by the temperature sensor 22. The temperature sensor 22 includes a leaf spring 22*a* having its first end fixed to the stay 16, a thermistor 22*b* serving as a temperature detecting element disposed on a second end of the leaf spring 22*a*, and a sponge 22*c* interposed between the leaf spring 22*a* and the thermistor 22*b*. A surface of the thermistor 22*b* is covered with a polyimide tape having a thickness of 50 μm to ensure electric insulation. The sponge 22*c* functions as a heat insulating material for the thermistor 22*b* and also functions to fit the thermistor 22*b* flexibly to the fixing film 13 serving as the measurement target.

3. Heating Principle

Figure 5:
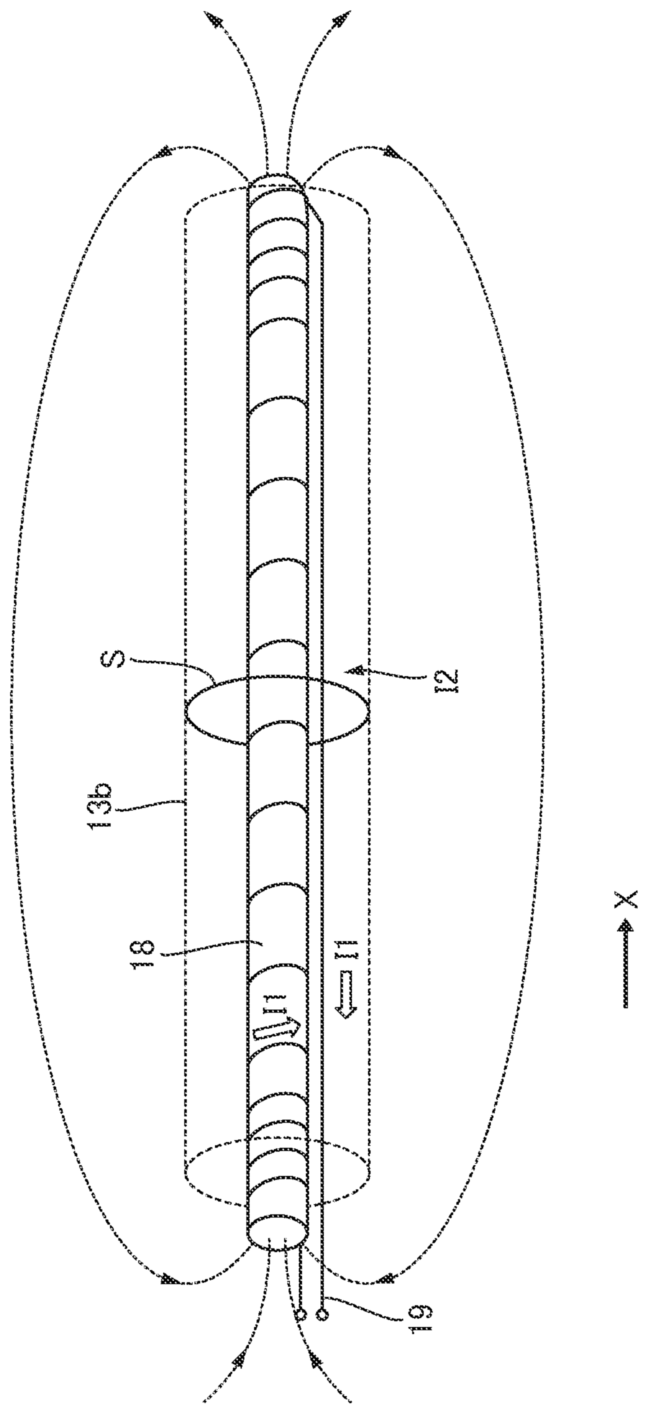
FIG. 5 is a view illustrating a heating principle of the fixing unit according to the embodiment.

FIG. 5 is a conceptual diagram illustrating a moment where current flowing along the exciting coil 19 toward the direction of arrow I1 has increased. In the fixing unit 12 according to the present embodiment, when a high-frequency current is flown through the exciting coil 19, a magnetic field is formed where most, i.e., 90% or more, of the magnetic flux occurring from the first end of the magnetic core 18 passes through the external space of the fixing film 13 and returns to the second end of the magnetic core 18. Induced current, i.e., circulating current, flows through the heat generating layer 13*b* of the fixing film 13 toward the direction of arrow 12, i.e., direction cancelling out the variation of the magnetic field, within the circumferential direction of the fixing film 13. In the drawing, S indicates a portion of the induced current flowing through the heat generating layer 13*b*. By having induced current flow through the heat generating layer 13*b*, the heat generating layer 13*b* generates heat by Joule heat.

The fixing unit 12 further comprises a power supply circuit that supplies high-frequency current to the exciting coil 19, and a control unit for controlling the power supply circuit. The control unit controls the power supply circuit so that the temperature of the fixing film 13 is set to a predetermined target temperature, i.e., fixing temperature, based on a detection signal of a temperature sensor 20. Thereby, the fixing film 13 is maintained at a temperature suitable for fixing the image.

As described, according to the present embodiment, a portion of the power supplied to the exciting coil 19 is converted to heat based on the principle of induction heating, and the fixing film 13 itself generates heat. The fixing unit 12 uses the heat to heat and fix the image on the recording material.

4. Shape of Sliding Member (Nip Forming Member)

A preferable shape of the sliding member 14 will be described. Since the main component of toner is thermoplastic resin, toner is softened along with the rising of temperature. Toner on the recording material P receives heat from the fixing film 13 at the nip portion N of the fixing unit 12, and the temperature thereof rises. Therefore, the temperature of toner while passing through the nip portion N becomes highest at an exit, i.e., downstream end in the recording material conveyance direction Y, of the nip portion N.

Therefore, in order to press and deform toner to fix the toner to the recording material P, it is efficient to press toner strongly at the vicinity of the exit of the nip portion N where softening of toner advances. That is, pressure distribution where a peak position of pressure at the nip portion N is biased toward the downstream side in the recording material conveyance direction Y of the nip portion N is preferable.

Further, the toner temperature rises higher if the contact time between toner on the recording material and the fixing film 13 is longer. Therefore, in order to fix the toner to the recording material P, it is preferable that the width of the nip portion N in the recording material conveyance direction Y is wide.

Figure 6:
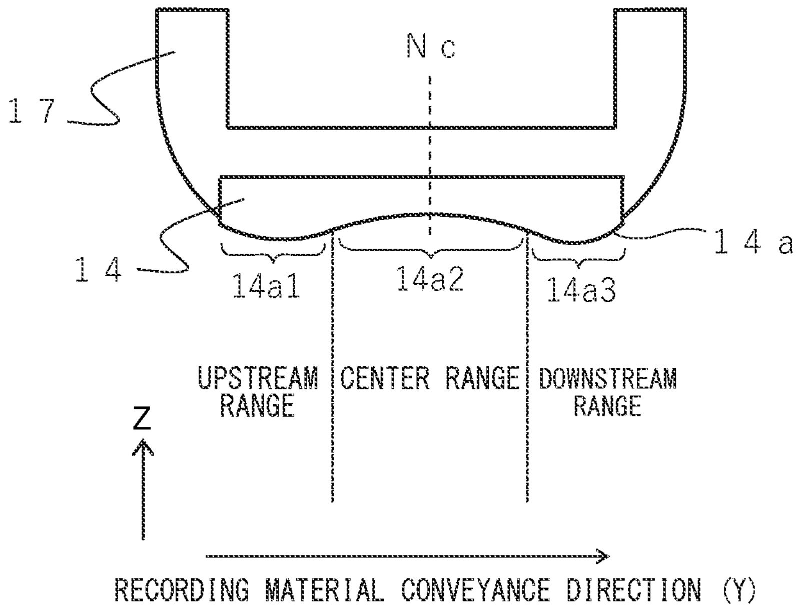
FIG. 6 is a view illustrating a shape of a sliding member according to the embodiment.

FIG. 6 is an example of a shape of the sliding member 14, i.e., nip forming member. FIG. 6 illustrates a cross-sectional shape of the sliding member 14 in a virtual plane perpendicular to the longitudinal direction X. In the following description, within the nip portion N, that is, contact range of the fixing film 13 and the pressing roller 15, a center point in the recording material conveyance direction Y is referred to as a center position Nc of the nip portion N. The range including the center position Nc of the nip portion N is referred to as a center range of the nip portion N. A range including an upstream end of the nip portion N in the recording material conveyance direction Y is referred to as an upstream range of the nip portion N. A range including a downstream end of the nip portion N in the recording material conveyance direction Y is referred to as a downstream range of the nip portion N.

The sliding member 14 according to the present embodiment has a surface being in sliding contact with the fixing film 13 of the sliding member 14, i.e., sliding surface 14*a*, formed as a curved surface, including an upstream-side projected portion 14*al*, a recess portion 14*a*2, and a downstream-side projected portion 14*a*3. The downstream-side projected portion 14*a*3 is an example of a protruded portion, and the upstream-side projected portion 14*al* is an example of a second protruded portion.

By forming the sliding surface 14*a* of the sliding member 14 to have a curved surface shape that is dented toward a side receding from the pressing roller 15 in the perpendicular direction Z, i.e., upper side in the drawing, the adhesiveness of the pressing roller 15 and the sliding member 14 may be enhanced. Further, by forming the sliding surface 14*a* to have a curved surface shape, the width of the nip portio N may be widened compared to a case where the sliding surface 14*a* of the sliding member 14 is formed to have a flat shape.

However, if the radius of curvature of the recess portion 14*a*2 is smaller than the radius of curvature of the outer circumference surface of the pressing roller 15, a range in which the pressure applied at the nip portion N is weak, i.e., weakening of pressure, near the center of the recess portion 14*a*2 may occur. Therefore, the radius of curvature of the recess portion 14*a*2 is preferably equal to or greater than the radius of curvature of the outer circumference surface of the pressing roller 15. Since the diameter of the pressing roller 15 according to the present embodiment is 30 mm, the radius of curvature thereof is 15 mm. Thus, the radius of curvature of the recess portion 14*a*2 according to the present embodiment is set to 20 mm. In this case, the width of the nip portion N may be widened without excessively increasing the deformation quantity of the pressing roller 15.

Further according to the present embodiment, by providing the downstream-side projected portion 14*a*3 serving as a protruded portion to the sliding surface 14*a* of the sliding member 14, a peak position of the pressure distribution at the nip portio N is set to be positioned within the downstream range of the nip portion N. The downstream-side projected portion 14*a*3 is a portion of the sliding surface 14*a*, and it is a protruded portion that is protruded toward the pressing roller 15 side in the perpendicular direction Z, i.e., downward in the drawing. An apex position of the downstream-side projected portion 14*a*3 in the perpendicular direction Z is positioned on the side having the pressing roller 15, i.e., downward in the drawing, of an apex position of the upstream-side projected portion 14*al* in the perpendicular direction Z. According to this configuration, the peak position of the pressure distribution at the nip portio N may be positioned within the downstream range of the nip portion N, and the fixity of the toner image may be enhanced.

From the viewpoint of fixity, the radius of curvature of the downstream-side projected portion 14*a*3 should be set smaller to increase the peak pressure of the pressure distribution at the nip portion N, and deformation of toner may be caused more effectively. However, as the radius of curvature of the downstream-side projected portion 14*a*3 reduces, bending stress applied to the fixing film 13 that is rotated along a rotation track along the sliding surface 14*a* increases.

If a portion where the film is bent with a large curvature is included in the rotation track of the fixing film 13, bending fatigue caused by bending deformation of the heat generating layer 13*b* occurs. If the apparatus is used for along period of time, the bending fatigue may cause cracking and permanent deformation to occur in the heat generating layer 13*b*, and the electric resistance of the heat generating layer 13*b* may increase, leading to deterioration of heating value and fixing failure of image accompanying the same.

Therefore, a minimum value of the radius of curvature of the downstream-side projected portion 14*a*3 according to the present embodiment is set to 6.0 mm. Meanwhile, a minimum value of the radius of curvature of the upstream-side projected portion 14*a*1 of the sliding surface 14*a* is greater than 6.0 mm. In other words, the minimum value of the radius of curvature of the downstream-side projected portion 14_a_3, i.e., protruded portion, when viewed in the longitudinal direction X is smaller than the minimum value of the radius of curvature of the recess portion 14_a_2 and the minimum value of the radius of curvature of the upstream-side projected portion 14_al_, i.e., second protruded portion, when viewed in the longitudinal direction X. Thereby, the pressure at the downstream range in the nip portion N may be increased by the downstream-side projected portion 14_a_3.

It is also possible to adopt a configuration where the minimum value of the radius of curvature of the downstream-side projected portion 14_a_3 and the minimum value of the radius of curvature of the upstream-side projected portion 14_al_ are the same, that is, there are two portions where the curvature of the fixing film 13 is maximum, which are the contact portion of the downstream-side projected portion 14_a_3 and the contact portion of the upstream-side projected portion 14_al._

5. Neutral Axis of Fixing Film

Figure 7:
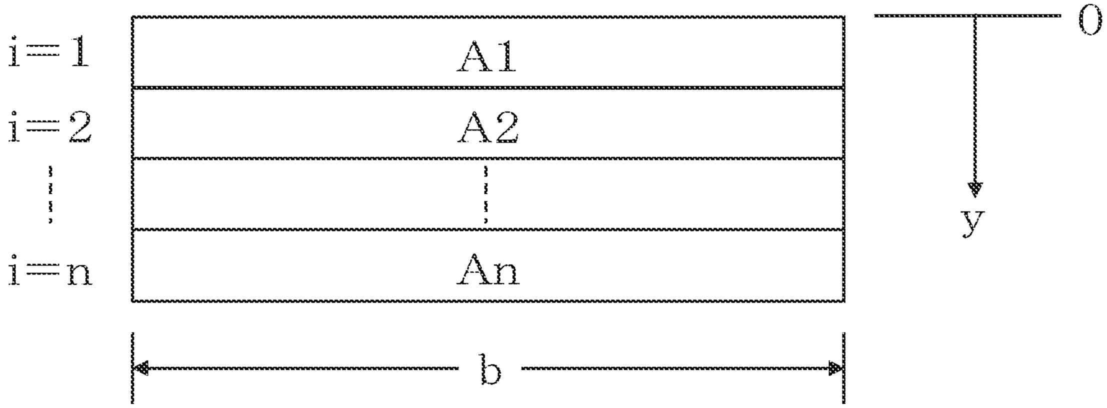
FIG. 7 is a view illustrating a neutral axis in a film-like member.

Next, a neutral axis of the fixing film 13 will be described. A film-like member, i.e., belt-like member, composed of n layers as illustrated in FIG. 7 is assumed. An outer surface of the film-like member is set as reference (y=0), wherein a distance of the film-like member in a thickness direction is referred to as y, a cross-sectional area of an i-th layer from the outer surface is referred to as Ai, a width of the i-th layer is referred to as bi, and an elastic modulus, i.e., Young's modulus, is referred to as Ei. In this case, a distance (y0) from the outer surface of the film-like member to the neutral axis is defined by the following expression, Expression 1.

$$y_0 = \frac{\sum_i \left( E_i \int_{A_i} y dA_i \right)}{\sum_i (E_i A_i)} \quad \text{Expression 1}$$

In the expression, considering the range of a unit width (b=1), dAi=dyi is satisfied, and the distance (y0) from the outer surface of the film-like member to the neutral axis is expressed by the following expression.

$$y_0 = \frac{\sum_i \left( E_i \int_{A_i} y dy_i \right)}{\sum_i (E_i y_i)} \quad \text{Expression 2}$$

In order to confirm the relationship between the position of the neutral axis and the rising of resistance of the heat generating layer 13_b_, the fixing films 13 respectively satisfying three conditions, which are condition A (FIG. 8), condition B (FIG. 9), and condition C (FIG. 10), wherein the thicknesses of the surface layer 13_d_, the heat generating layer 13_b_, and the base layer 13_a_ are the same but the thickness of the protective layer 13_c_ differ, were created. The Young's modulus of the respective layers is common among the three conditions, which is 60 kgf/mm$^2$ for the PFA of the surface layer 13_d_, 700 kgf/mm$^2$ for the polyimide of the protective layer, 13200 kgf/mm$^2$ for the copper of the beat generating layer 13_b_, and 700 kgf/mm$^2$ for the polyimide of the base layer 13_a_. The thicknesses of the respective layers according to the respective conditions are as shown in Table 1.

TABLE 1

| | CONDITION A | CONDITION B | CONDITION C |
|---|---|---|---|
| SURFACE LAYER 13d | 30 μm | 30 μm | 30 μm |
| PROTECTIVE LAYER 13c | 37 μm | 9 μm | 60 μm |
| HEAT GENERATING LAYER 13b | 1 μm | 1 μm | 1 μm |
| BASE LAYER13a | 40 μm | 40 μm | 40 μm |
| NEUTRAL AXIS y0 | 67.3 μm | 49.6 μm | 80.6 μm |

Figure 8:
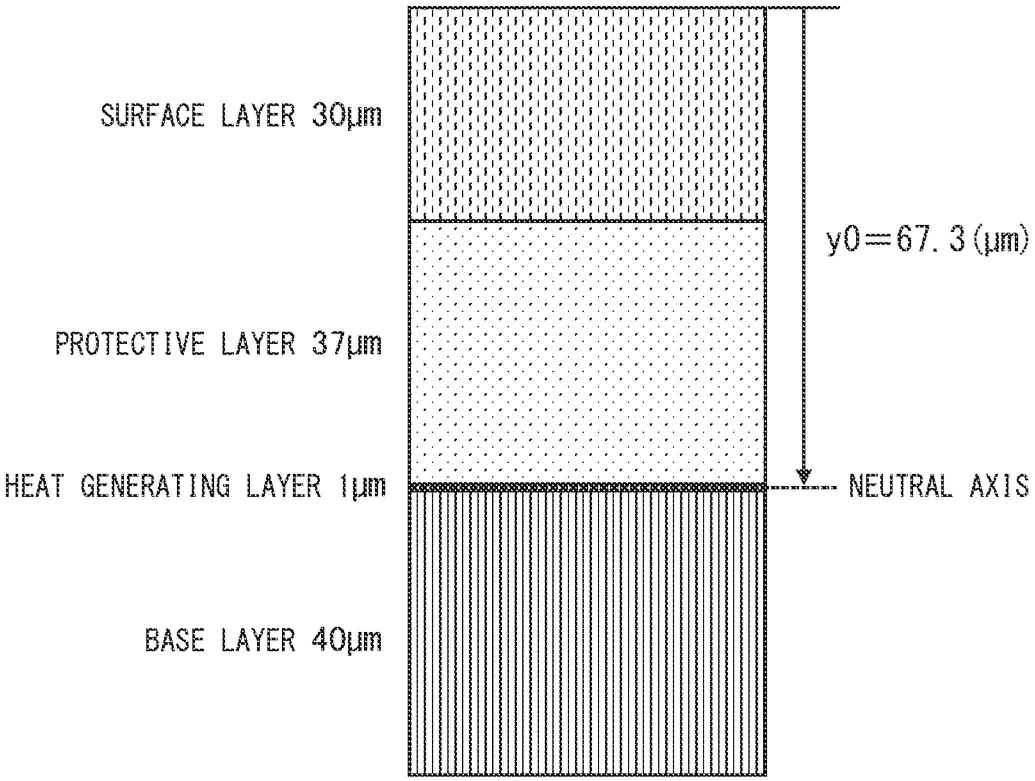
FIG. 8 is a view illustrating an example of a fixing film whose neutral axis is positioned within a heat generating layer.
Figure 9:
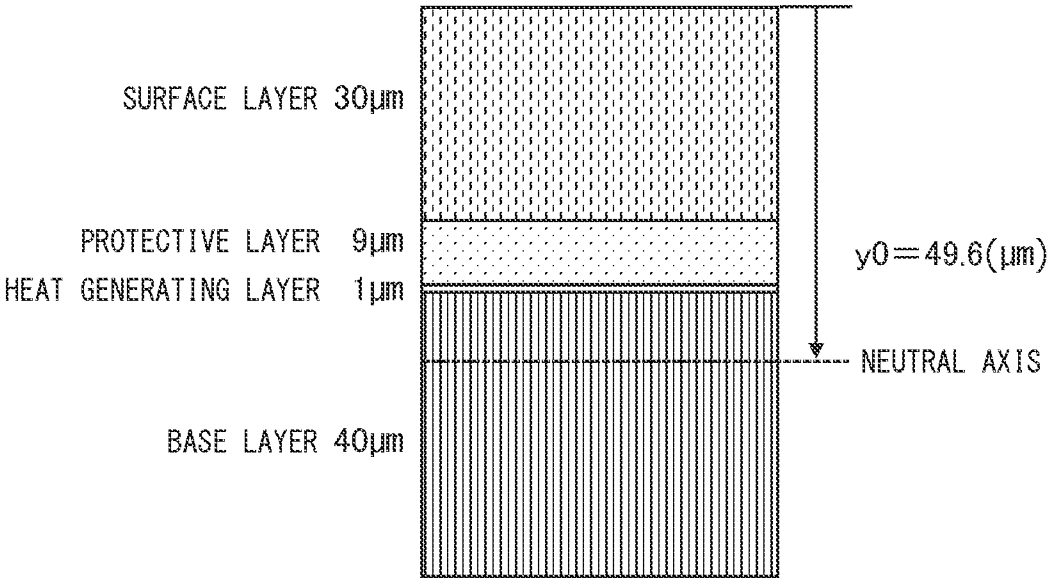
FIG. 9 is a view illustrating an example of a fixing film whose neutral axis is positioned within a base layer.
Figure 10:
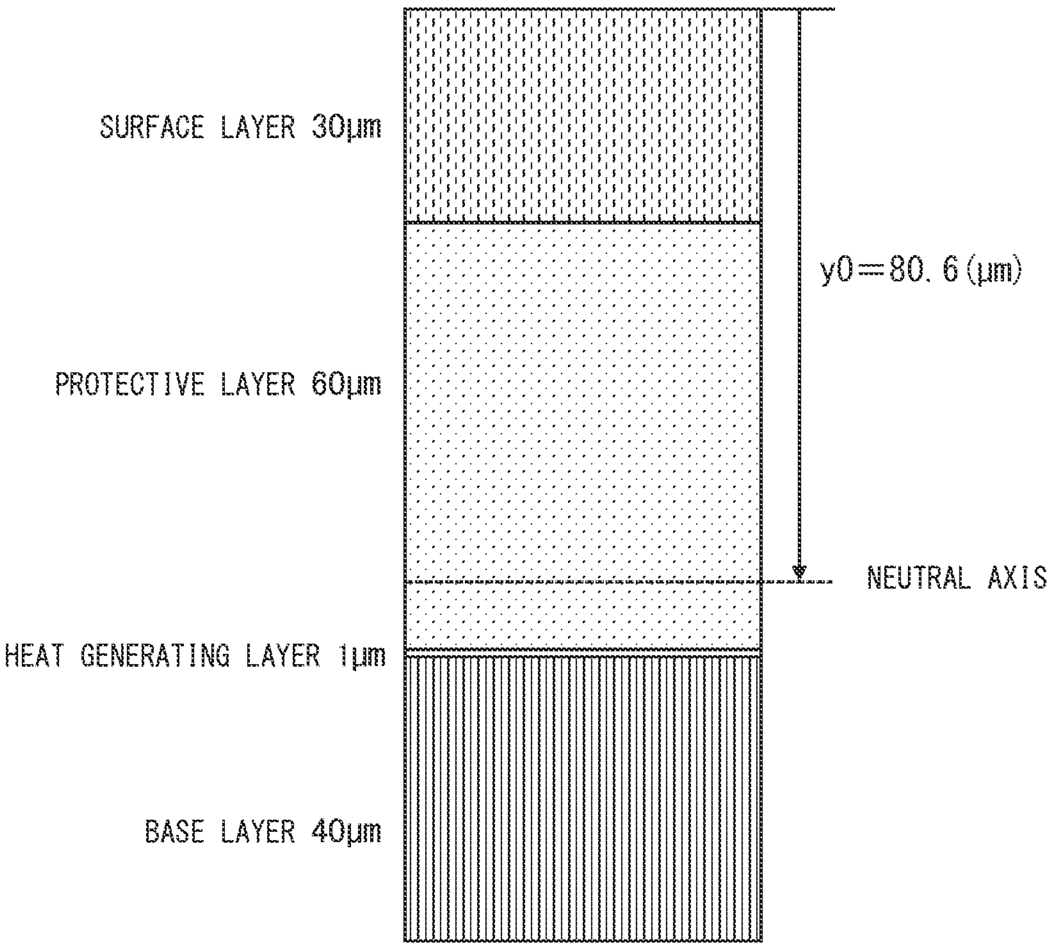
FIG. 10 illustrates an example of a fixing film whose neutral axis is positioned within a protective layer.

According to condition A, the position of approximately 67.3 μm from the outer surface is a neutral axis y0, and as shown in FIG. 8, the neutral axis y0 is positioned approximately at a center of the heat generating layer 13_b_. According to condition B, the position of approximately 49.6 μm from the outer surface is the neutral axis y0, and as shown in FIG. 9, the neutral axis y0 is deviated by approximately 10 μm from the center of the heat generating layer 13_b_ toward the base layer 13_a_ side, that is, the inner circumference side of the fixing film 13. According to condition C, the position of approximately 80.6 μm from the outer surface is the neutral axis y0, and as shown in FIG. 10, the neutral axis y0 is deviated by approximately 10 μm from the center of the heat generating layer 13_b_ toward the protective layer 13_c_ side, that is, the outer circumference side of the fixing film 13.

Figure 11:
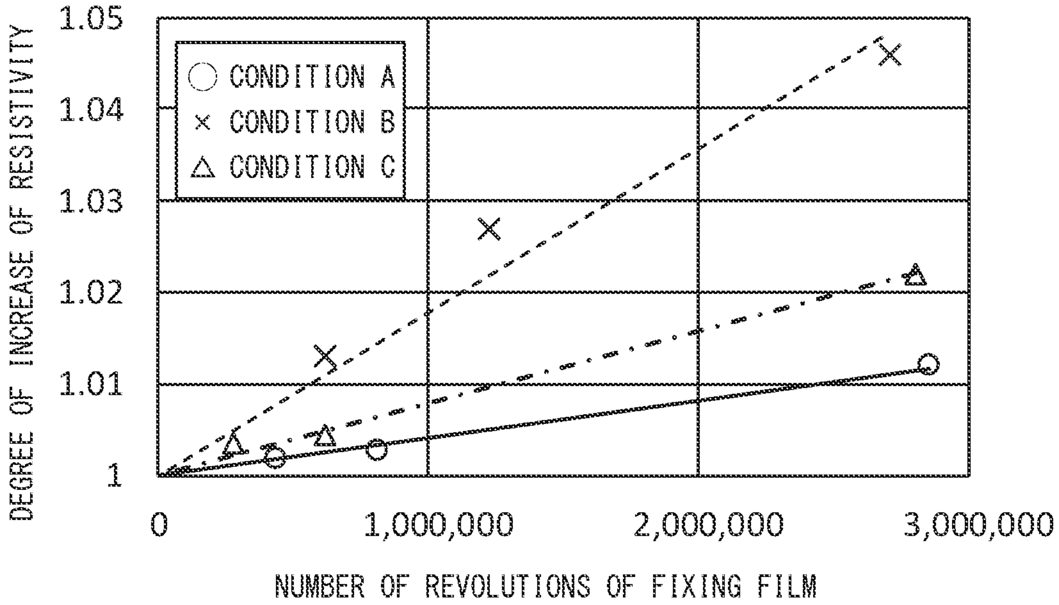
FIG. 11 is a view in which degree of increase of resistivities according to respective examples illustrated in FIGS. 8 to 10 are compared.

The fixing films 13 according to the three conditions described above were attached to the fixing unit 12, the pressing roller 15 and the fixing film 13 were rotated, and the increase rates of electrical resistivity, i.e., degree of increase of resistivity, with respect to the number of revolutions were measured. The electrical resistivity was calculated based on a current value that has been flown when an AC voltage of a fixed amplitude was applied to the exciting coil 19. The results are shown in FIG. 11. A horizontal axis of the graph denotes a number of revolutions, i.e., accumulated number of revolutions, of the fixing film 13. A vertical axis of the graph denotes a degree of increase of resistivity in a case where an initial resistance value of the fixing film 13 was normalized to 1.

As can be recognized from the graph showing the magnitude correlation of the rising of resistance, the rising of resistance of condition A was smallest, the rising of resistance of condition C was second smallest, and the rising of resistance of condition B was greatest. In other words, according to condition A, the performance of the fixing film 13 was maintained for a long period of time, whereas according to condition B, the performance of the fixing film 13 was deteriorated most quickly.

In the example, though the amount of deviation of the neutral axis from the center of the heat generation layer 13_b_ was approximately the same level according to condition B and condition C, the degree of rising of resistance was smaller according to condition C. This result will be considered below.

The sliding member 14 adopted in the present embodiment includes the downstream-side projected portion 14_a_3 serving as a protruded portion that is protruded toward the pressing roller 15 side at the vicinity of the exit of the nip portion N. The downstream-side projected portion 14_a_3 is the area where the radius of curvature becomes minimum within the rotation track of the fixing film 13 when viewed in the longitudinal direction X. In other words, the sliding member 14 serving as the nip forming member is configured such that the curvature of the film when viewed in the first direction becomes maximum at the contact portion with the protruded portion.

Therefore, if the fixing film 13 rotates while being in sliding contact with the sliding member 14, the fixing film 13 receives the maximum bending stress at the contact portion with the protruded portion, i.e., the downstream-side projected portion 14*a*3, of the sliding member 14.

Figure 12:
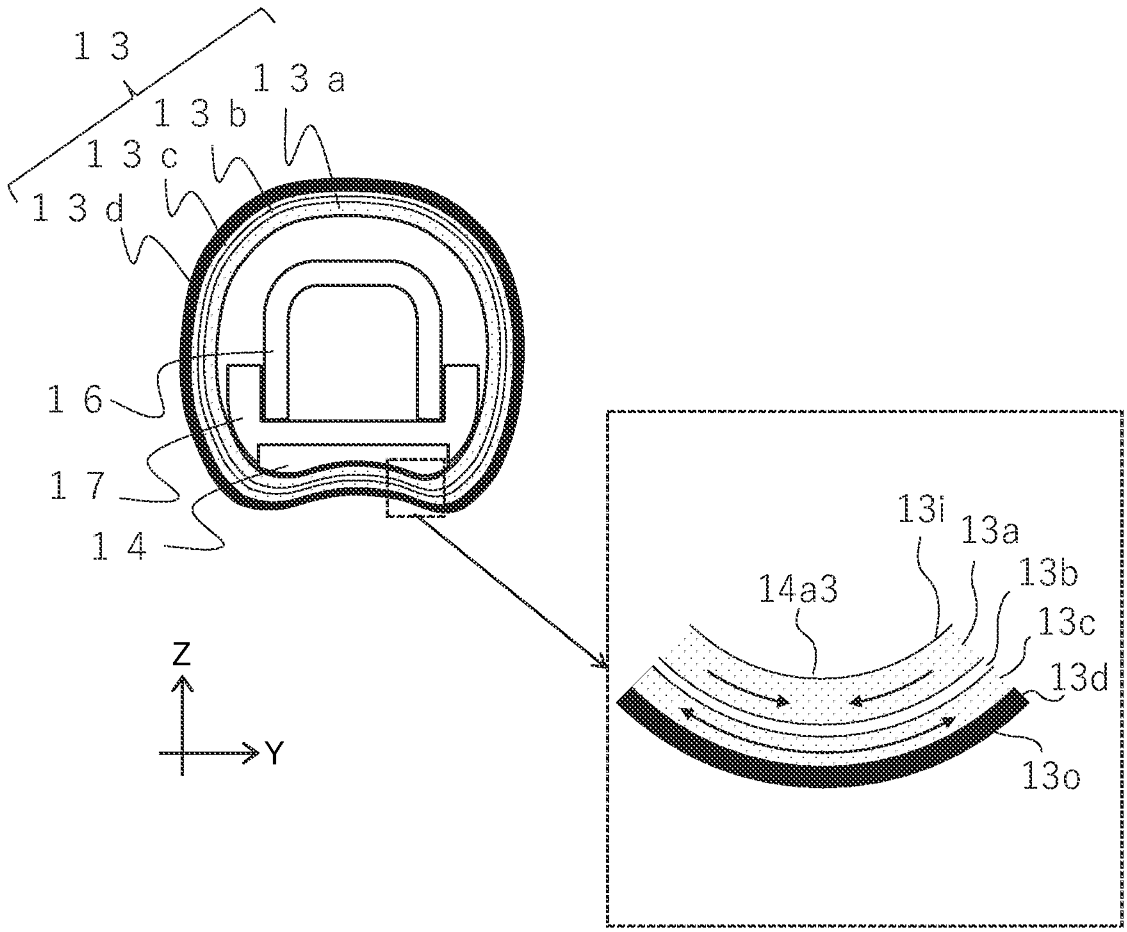
FIG. 12 is a view illustrating deformation and stress in a fixing film at a protruded portion of a sliding member.

As illustrated in FIG. 12, the direction of bending deformation of the portion of the fixing film 13 that is in contact with the protruded portion, i.e., the downstream-side projected portion 14*a*3, is a direction in which an other surface 13*o* of the fixing film 13 expands and an inner surface 13*i* of the fixing film 13 contracts. In other words, at the contact portion with the protruded portion, i.e., the downstream-side projected portion 14*a*3, the stress applied on the cross section that crosses the fixing film 13 in the thickness direction and the longitudinal direction X is a tensile force at the outer circumference side of the fixing film 13 and a compressive force at the inner circumference side thereof with respect to the neutral axis.

In the case of condition A, the heat generating layer 13*b* is positioned on the neutral axis y0, such that neither tensile force nor compressive force are easily applied. Therefore, according to condition A, cracking and other problems will not easily occur to the heat generating layer 13*b* even if the number of revolutions of the fixing film 13 increases, and it is assumed that as a result, the degree of increase of resistivity was smallest.

According to condition B, the heat generating layer 13*b* is positioned on the outer circumference side of the neutral axis y0, such that at the contact portion with the protruded portion, i.e., the downstream-side projected portion 14*a*3, tensile force acts on the heat generating layer 13*b*. According to the induction heating method adopted in the present embodiment, the current flows in the circumferential direction of the fixing film 13, such that the rising of resistance in the circumferential direction becomes a problem. In the case of condition B, when the heat generating layer 13*b* is elongated in the circumferential direction at the contact portion with the protruded portion, i.e., the downstream-side projected portion 14*a*3, microscopic cracks may occur in the heat generating layer 13*b*, and it is assumed that the rising of resistance became significant due to the growing or accumulating of the cracks accompanying the increase in the number of revolutions.

Meanwhile, according to condition C, the heat generating layer 13*b* is positioned on the inner circumference side of the neutral axis y0, such that at the contact portion with the protruded portion, i.e., the downstream-side projected portion 14*a*3, compressive force acts on the heat generating layer 13*b*. In that case, since the direction of the stress received by the heat generating layer 13*b* at the contact portion with the protruded portion, i.e., the downstream-side projected portion 143, is the direction of compression, it is considered that microscopic cracks relatively unlikely to occur. Therefore, even if the degree of the stress received by the heat generating layer 13*b* is approximately the same level as condition B, it is assumed that condition C causes less damage of the heat generating layer 13*b* that leads to the rising of resistance of the fixing film 13 in the circumferential direction compared to condition B.

In other words, even if the heat generating layer 13*b* is deviated from the position of the neutral axis y0 of the fixing film 13, it has been recognized that if the heat generating layer 13*b* is deviated toward the protected layer 13*c* i.e., outer circumference side, as in condition C, the damage of the heat generating layer 13*b* that leads to the deterioration of performance of the fixing film 13 is small. Meanwhile, if the heat generating layer 13*b* is deviated toward the base layer 13*a* side, i.e., inner circumference side, from the position of the neutral axis y0 of the fixing film 13, it has been recognized that even if the amount of deviation is relatively small, microscopic cracks of the heat generating layer 13*b* that leads to the deterioration of performance of the fixing film 13 tends to occur.

As described, regarding the tendency of occurrence of damage of the heat generating layer 13*b* that may lead to the deterioration of performance of the fixing film 13, it has been determined that there is an asymmetric property in the directions of positional deviation of the heat generating layer 13*b* from the neutral axis y0 of the fixing film 13.

If the film thicknesses of the respective layers of the fixing film 13 may be created according to design values, it is preferable that the neutral axis y0 is positioned in the heat generating layer 13*b*, but the film thicknesses of the respective layers may be varied according to fabrication tolerances. Especially, certain levels of dispersion may occur to the film thicknesses of the base layer 13*a* and the protective layer 13*c*, which influence the position of the neutral axis y0 greatly.

Therefore, the present embodiment focuses on the asymmetry described above, and defines the positional relationship between the heat generating layer 13*b* and the neutral axis y0 so that the fixing film 13 exerts a stable performance through a long term of use even if the film thicknesses of the respective layers of the fixing film 13 are varied. Specifically, the film thicknesses of the respective layers of the fixing film 13 were set such that even if the film thicknesses of the base layer 13*a* and the protective layer 13*c* were varied due to fabrication tolerance, the heat generating layer 13*b* will not be positioned on the outer circumference side, that is, the side where tensile force acts at the contact portion with the protruded portion, of the neutral axis y0.

The dispersion of film thicknesses of the base layer 13*a* and the protective layer 13*c* during fabrication was confirmed, and it was recognized that a dispersion of approximately 5 μm occurred. Therefore, according to the present embodiment, a positional relationship is realized where the heat generating layer 13*b* is not positioned on the outer circumference side of the neutral axis y0 even if dispersion of approximately ±5 μm occurred to the film thicknesses of the base layer 13*a* and the protective layer 13*c*.

Figure 13:
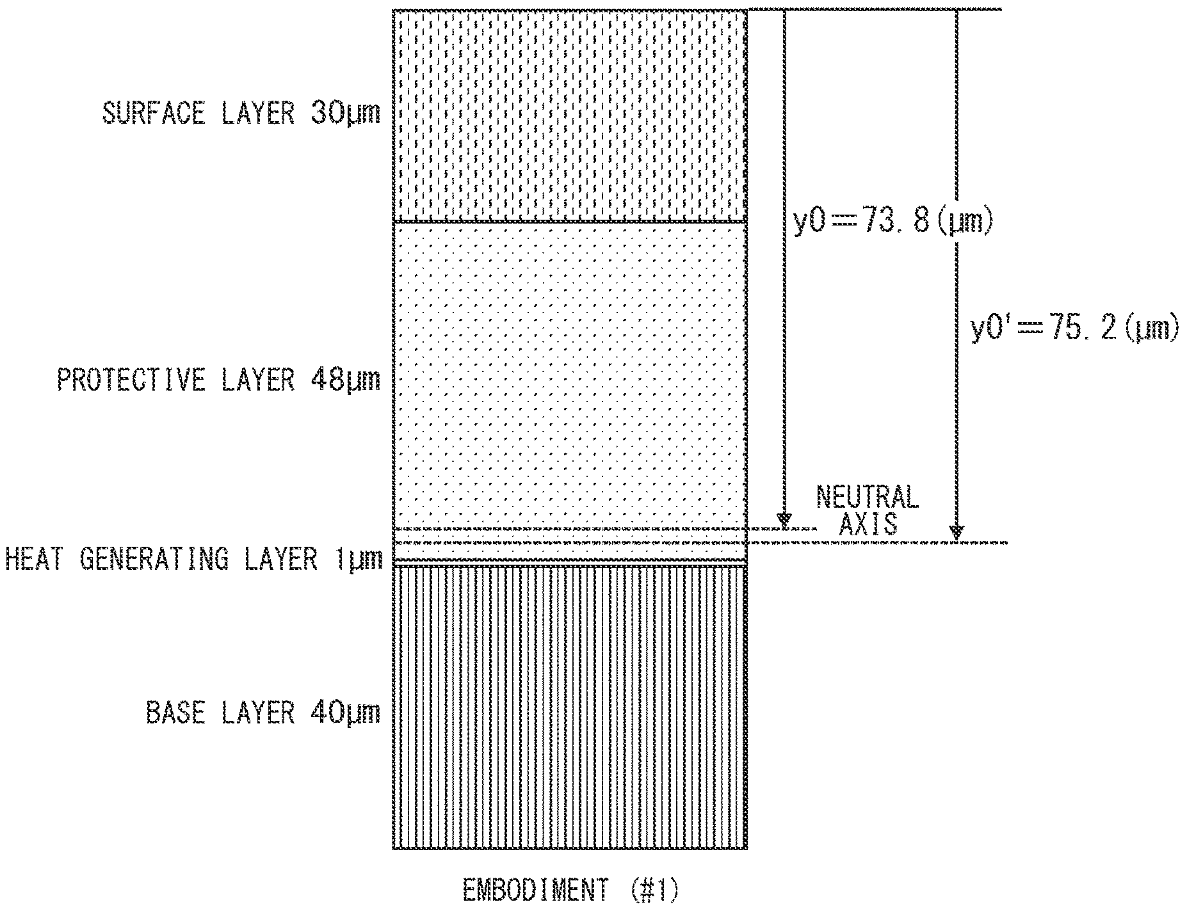
FIG. 13 is a view illustrating a layer configuration of a fixing film sample (#1) according to the embodiment.

FIG. 13 illustrates one example of the layer configuration according to the present embodiment. FIG. 13 illustrates the fixing film 13 (#1) where the film thicknesses of the respective layers comply with design values. The design values of the film thickness of the respective layers are 30 μm for the surface layer 13*d*, 48 μm for the protective layer 13*c*, 1 μm for the heat generating layer 13*b*, and 40 μm for the base layer 13*a*. If the film thicknesses are formed to comply with the design values, the neutral axis y0 will be positioned at 73.8 μm from the outer surface, and will be positioned within the protective layer 13*c* at a position deviated by approximately 4.7 μm toward the outer circumference side in the thickness direction from the center of the heat generating layer 13*b*.

Figure 14:
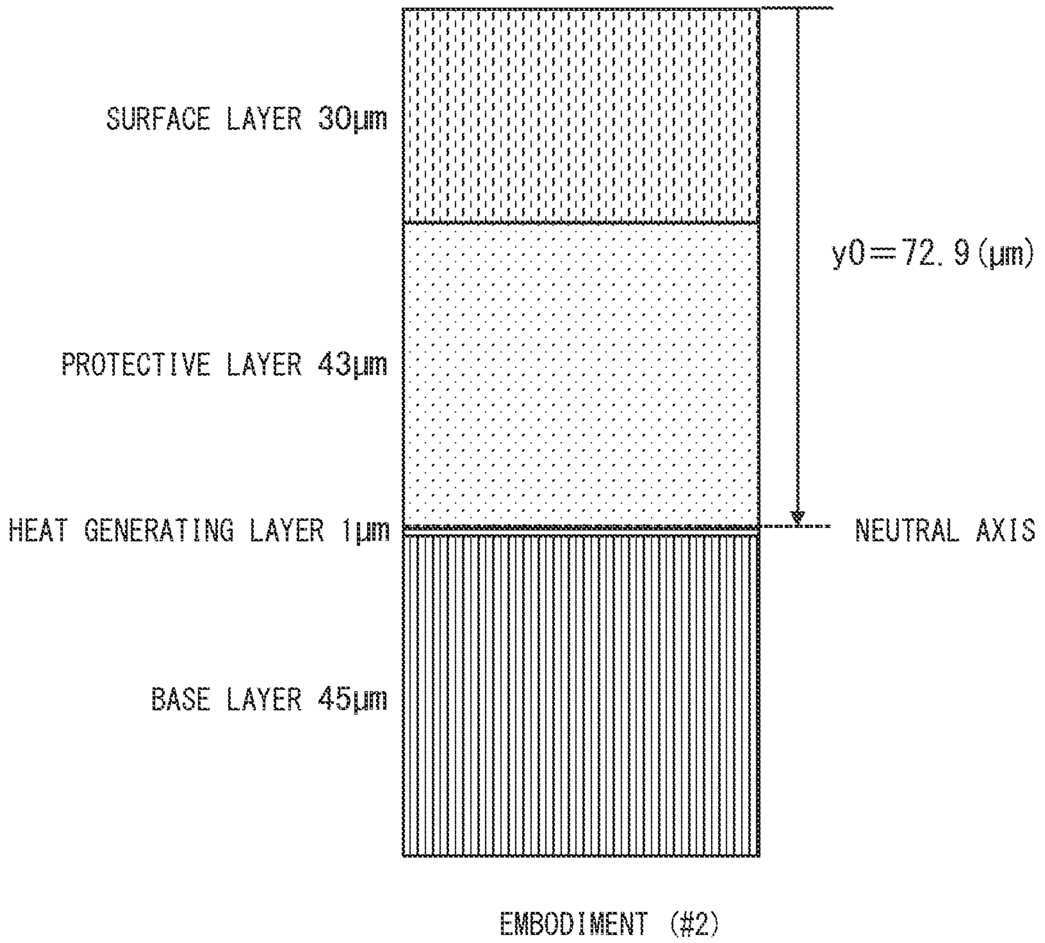
FIG. 14 is a view illustrating a layer configuration of a fixing film sample (#2) according to the embodiment.
Figure 15:
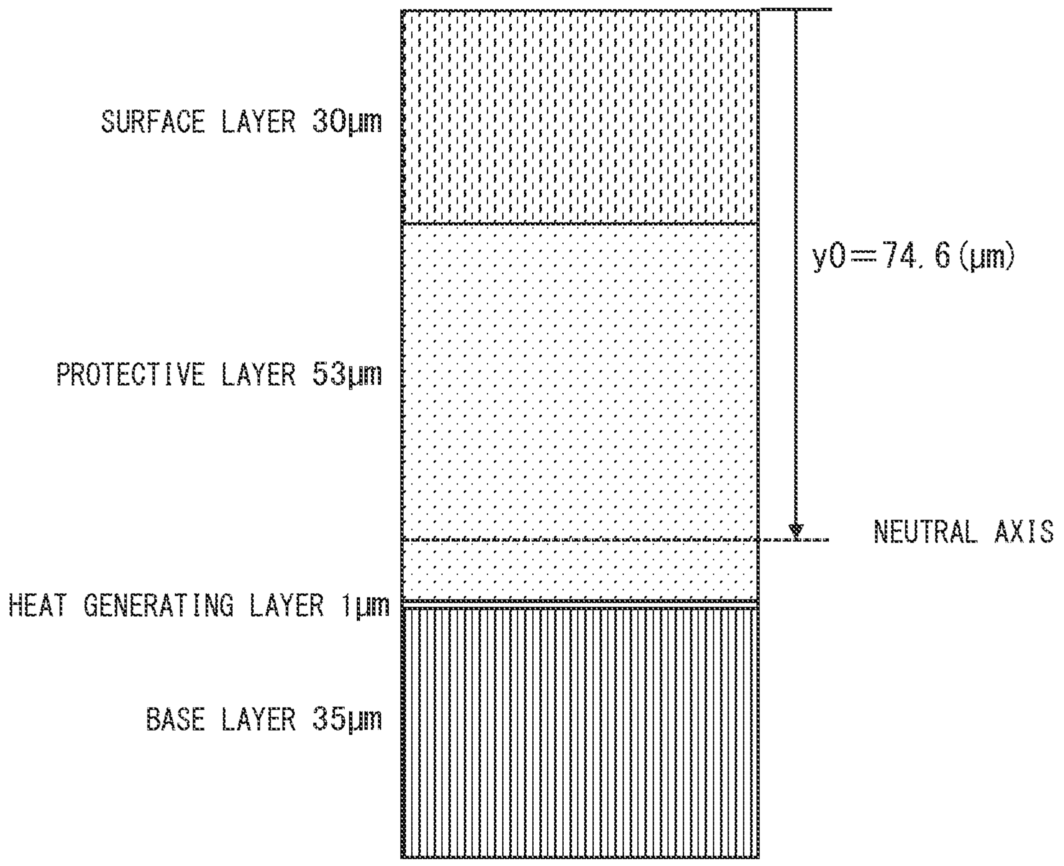
FIG. 15 is a view illustrating a layer configuration of a fixing film sample (#3) according to the embodiment.

FIGS. 14 and 15 illustrate the fixing film 13 in a case where the position of the neutral axis y0 is varied by the dispersion of film thicknesses according to the present embodiment. FIG. 14 is the fixing film 13 (#2) of a case where the base layer 13*a* is thicker than the design value and the protective layer 13*c* is thinner than the design value. In this case, the neutral axis y0 is positioned at 72.9 μm from the outer surface, and is positioned within the protective layer 13*c* at a position deviated by approximately 0.6 μm toward the outer circumference side from the heat generating layer 13*b*. FIG. 15 is the fixing film 13 (#3) of a case where the base layer 13*a* is thinner than the design value and the protective layer 13*c* is thicker than the design value. In this case, the neutral axis y0 is positioned at 74.6 μm from the outer surface, and is positioned within the protective layer 13*c* at a position deviated by approximately 8.9 μm toward the outer circumference side from the center of the heat generating layer 13*b*.

As described, according to the present embodiment, even if the position of the neutral axis y0 is varied by dispersion of film thicknesses, a positional relationship in which the neutral axis y0 is positioned within the protective layer 13*c*, i.e., within the outer layer, and the heat generating layer 13*b* is positioned on the inner circumference side of the neutral axis y0 is maintained. In other words, according to the present embodiment, the neutral axis y0 of the fixing film 13 is positioned within the protective layer 13*c*, i.e., within the outer layer.

Figure 16:
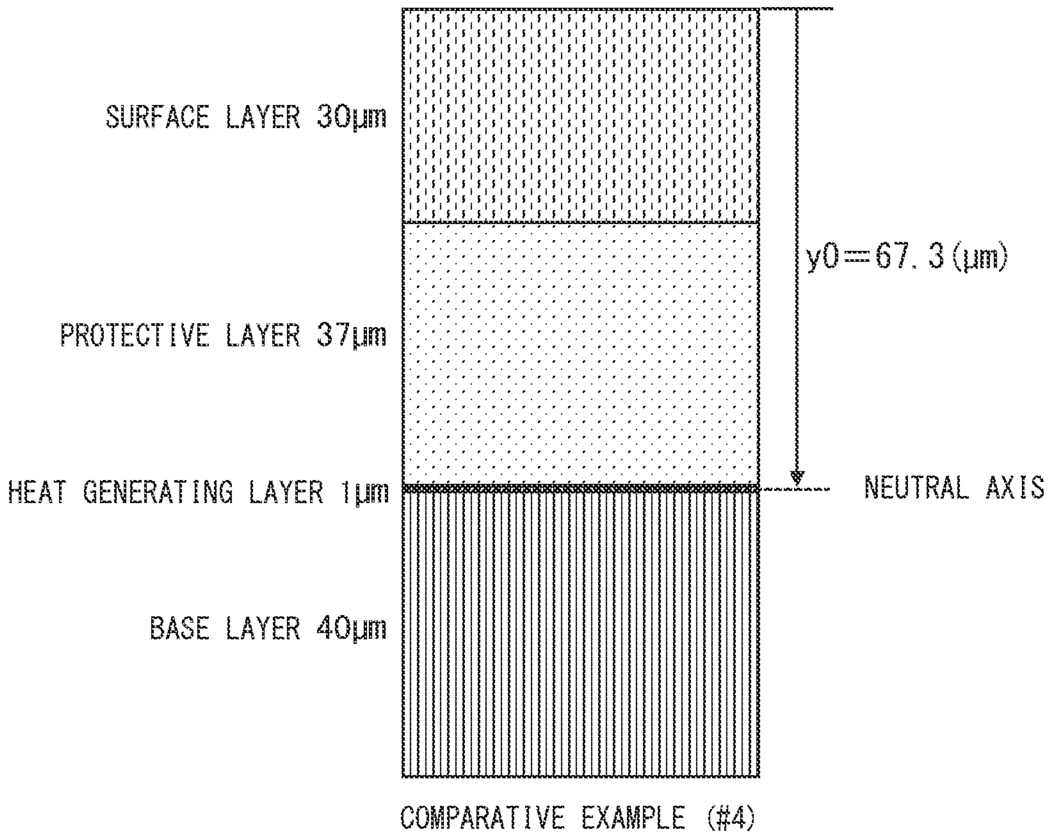
FIG. 16 is a view illustrating a layer configuration of a fixing film sample (#4) according to a comparative example.

FIG. 16 illustrates a layer configuration according to a comparative example. FIG. 16 illustrates the fixing film 13 (#4) of a case where the film thicknesses of the respective layers are according to design value of the comparative example. The comparative example is configured such that the neutral axis y0 is positioned approximately at the center of the heat generating layer 13*b*. Specifically, the design values of film thicknesses of the respective layers are 30 μm for the surface layer 13*d*, 37 μm for the protective layer 13*c*, 1 μm for the heat generating layer 13*b*, and 40 μm for the base layer 13*a*. If the film thicknesses are formed according to the design values, the neutral axis y0 will be positioned at 67.3 μm from the outer surface, and is positioned within the heat generating layer 13*b*.

Figure 17:
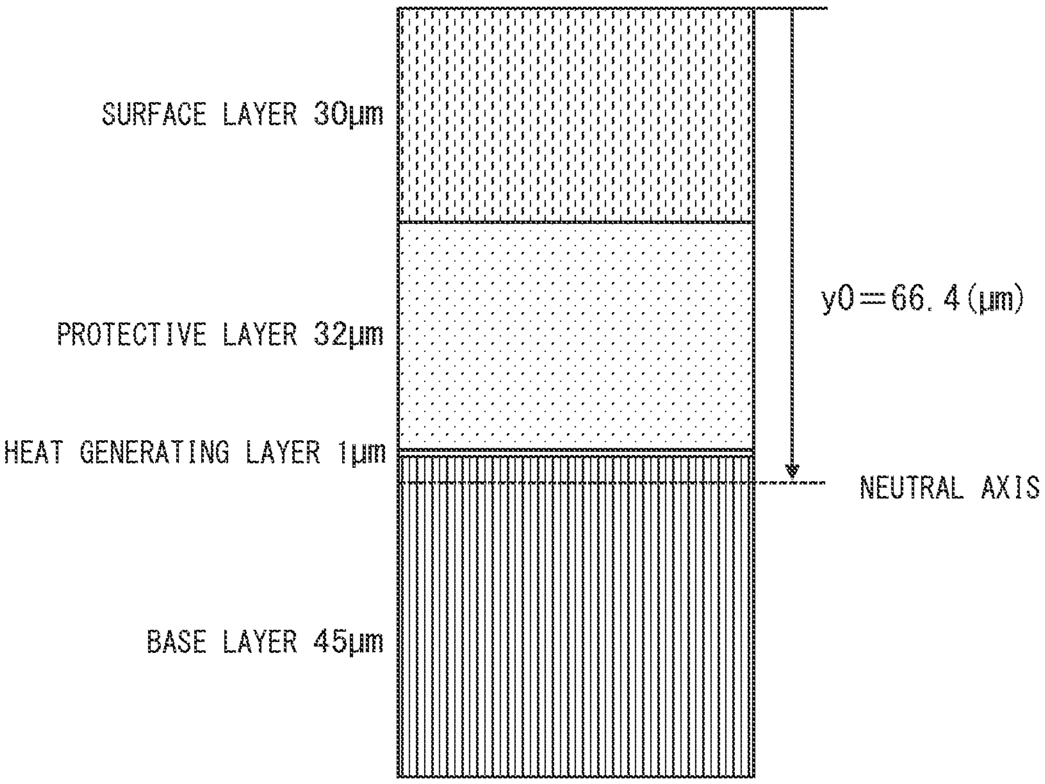
FIG. 17 is a view illustrating a layer configuration of a fixing film sample (#5) according to the comparative example.
Figure 18:
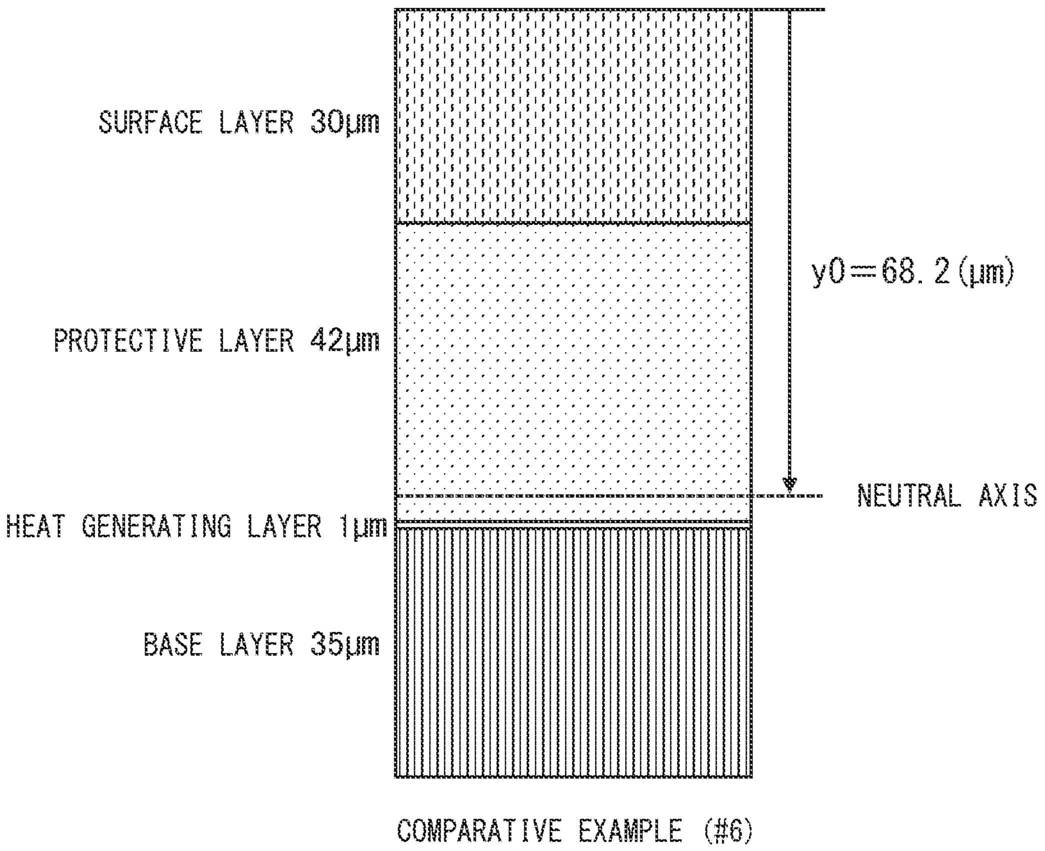
FIG. 18 is a view illustrating a layer configuration of a fixing film sample (#6) according to the comparative example.

FIGS. 17 and 18 illustrate the fixing film 13 according to a comparative example where the position of the neutral axis y0 is varied by dispersion of film thicknesses. FIG. 17 illustrates the fixing film 13 (#5) of a case where the base layer 13*a* is thicker than the design value and the protective layer 13*c* is thinner than the design value. In this case, the neutral axis y0 is positioned at 66.4 μm from the outer surface, and it is positioned within the base layer 13*a* deviated by approximately 3.9 μm toward the inner circumference side from the center of the heat generating layer 13*b*. FIG. 18 illustrates the fixing film 13 (#6) of a case where the base layer 13*a* is thinner than the design value and the protective layer 13*c* is thicker than the design value. In this case, the neutral axis y0 is positioned at 68.2 μm from the outer surface, and it is positioned within the protective layer 13*c* deviated by approximately 4.3 μm toward the outer circumference side from the center of the heat generating layer 13*b*.

As described, according to the comparative example, in a case where the position of the neutral axis y0 is varied according to dispersion of film thicknesses, a positional relationship may be realized (FIG. 17) where the neutral axis y0 is positioned within the base layer 13*a*, i.e., within the inner layer, and the heat generating layer 13*b* is positioned on the outer circumference side of the neutral axis y0.

The respective samples #1 to #6 of the fixing film 13 according to the present embodiment and the comparative examples were attached to the fixing unit 12, the pressing roller 15 and the fixing film 13 were rotated, and the increase rate of electrical resistivity, i.e., degree of increase of resistivity, with respect to the number of revolutions was measured. Table 2 illustrates the degree of increase of resistivity at a point of time where the fixing films 13 according to the respective samples were rotated for 3,000,000 times, wherein the initial resistance value is normalized by 1.

TABLE 2

| | FIXING FILM | RESISTIVITY INCREASE RATE WHEN ROTATED 3,000,000 TIMES) |
|---|---|---|
| EMBODIMENT | #1 | 1.014 |
| | #2 | 1.012 |
| | #3 | 1.021 |
| COMPARATIVE EXAMPLE | #4 | 1.012 |
| | #5 | 1.036 |
| | #6 | 1.014 |

As shown in Table 2, when comparing the present embodiment and the comparative examples of cases where the film thicknesses were according to design value (#1 and #4), in both cases, the degree of increase of resistivity was suppressed to a sufficiently low value (1.012 and 1.014) that is sufficient for practical use, wherein the value was somewhat smaller in the comparative example.

However, according to the comparative examples, when comparing the cases having dispersion of film thicknesses (#5 and #6), in one of the cases, the degree of increase of resistivity was significantly increased to 1.036 (#5). In contrast, according to the present embodiment, even if there is a dispersion of film thicknesses (#2 and #3), the degree of increase of resistivity was suppressed to a sufficiently low value (1.012 and 1.021) that is sufficient for practical use.

Therefore, it was confirmed that according to the layer configuration of the present embodiment, the rising of resistance of the heat generating layer 13*b* may be suppressed for a long period of time and more stably, i.e., with robustness, with respect to the dispersion of film thicknesses during manufacture.

As described, according to the present embodiment, by adopting a layer configuration in which the neutral axis y0 is positioned within the protective layer 13*c*, it was possible to suppress the rising of resistance of the heat generating layer 13*b* to a low value. Further, it became possible to allow dispersion during manufacture, such that yield may be improved significantly.

In other words, by setting the position of the neutral axis y0 considering the dispersion of film thicknesses that occurs during manufacture based on the asymmetry of positional deviation of the neutral axis with respect to the tendency of occurrence of rising of resistance of the heat generating layer 13*b*, it becomes possible to manufacture the fixing film 13 that exerts a stable function for a long period of time.

If the position of the neutral axis y0 is set to be within the protective layer 13*c*, the material of the protective layer 13*c* should preferably be an insulator, i.e., insulating resin. Metal, which may cause rising of resistance due to bending fatigue, is not preferable as the material of the protective layer 13*c*. If a metal is adopted as the material of the protective layer 13*c*, current will also flow through the protective layer 13*c* and contribute to heat generation. If the neutral axis y0 is set to be within the protective layer 13*c*, a strong tensile force is applied on the layers constituting the protective layer 13*c* positioned on the outer circumference side of the neutral axis y0 at the contact portion with the protruded portion, i.e., the downstream-side projected portion 14*a*3, of the sliding member 14. As a result, microscopic cracks are generated in the protective layer 13*c*, and a significant rising of resistance occurs during a long period of time during which the film is used. That is, the amount of current drops by deterioration of the protective layer 13*c*, and the heating value may be reduced.

Modified Example

In the above-mentioned embodiment, mainly the film thicknesses of the base layer 13*a*, i.e., inner layer, and the protective layer 13*c*, i.e., outer layer, were adjusted as the method for controlling the position of the neutral axis y0, but the position of the neutral axis y0 may also be controlled by the different materials of the base layer 13*a* and the protective layer 13*c*. For example, if the base layer 13*a* is formed of a material having a lower elastic modulus, i.e., Young's modulus, compared to the protective layer 13*c*, the position of the neutral axis y0 may be moved toward the protective layer 13*c* even if the film thicknesses of the base layer 13*a* and the protective layer 13*c* are the same.

Even in a case where the position of the neutral axis y0 is controlled according to the difference in materials, the material of the protective layer 13*c* is still preferably an insulator, i.e., insulating resin. The reason is described above.

As illustrated in FIG. 13, the position of the neutral axis y0' of the fixing film 13 may be positioned within the protective layer 13*c*, i.e., within the outer layer, in a case where the position is obtained by excluding the surface layer 13*d*. The position of the neutral axis y0' with the surface layer 13*d* excluded is the position of approximately 75.2 μm from the original outer surface (y=0) of the fixing film 13, and it is within the protective layer 13*c*. While the fixing unit 12 is used for a long period of time, the surface layer 13*d* is worn by contact with the recording material, especially, the edge of the surface layer 13*d* is scraped by having the leading edge of the recording material collide thereto. If the wear of the surface layer 13*d* advances quicker than that of the base layer 13*a* due to edge scraping and the like, the position of the neutral axis is gradually changed from y0 toward y0'.

As long as the neutral axis y0' computed with the surface layer 13*d* excluded is positioned within the protective layer 13*c*, even if the position of the neutral axis is changed from y0 toward y0', the heat generating layer 13*b* will not easily be positioned on the outer circumference side of the neutral axis. That is, even if the position of the neutral axis is varied toward the inner circumference side due to wear of the surface layer 13*d*, microscopic cracks are not easily generated in the heat generating layer 13*b*, such that the rising of resistance of the fixing film 13 may be further suppressed for a long period of time.

Other Examples

In the present embodiment, a configuration has been described where an alternating magnetic field for causing induction heating of the heat generating layer 13*b* of the fixing film 13 is generated by the exciting coil 19 passed through the inner space of the fixing film 13. However, the present technique is not limited thereto, and the exciting coil for generating an alternating magnetic field for causing induction heating of the heat generating layer 13*b* of the fixing film 13 may be arranged in the outer space of the fixing film 13. For example, the exciting coil 19 may be arranged above the fixing film 13 in FIG. 2.

Further, the present technique is not limited to the induction heating method, and current may be supplied to the heat generating layer 13*b* by having a power feed member come into contact with the fixing film 13. That is, the power feed member and the current supply circuit supplying current to the heat generating layer 13*b* through the power feed member are another example of a heat generation mechanism for causing the heat generating layer 13*b* to generate heat. Even according to this case, for example, if the heat generating layer 13*b* is formed of a helical shape pattern that extends in the longitudinal direction X while circulating the fixing film 13 in the circumferential direction, rising of resistance by microscopic cracks in the heat generating layer 13*b* may occur.

According to the present disclosure, a fixing unit and an image forming apparatus equipped with a film that is capable of exerting a stable performance for a long period of time may be provided.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-210817, filed on Dec. 27, 2022, which is hereby incorporated by reference herein in its entirety.

What is claimed is:

1. A fixing unit comprising:

a tubular film;

a nip forming member including a surface configured to be in sliding contact with an inner surface of the film;

a magnetic body inserted to an inner space of the film and that extends in a longitudinal direction of the film;

a coil wound around the magnetic body, formed in a helical shape along the longitudinal direction, and inserted to the inner space of the film with the magnetic body; and a pressing roller that is configured to be in contact with an outer surface of the film, and that is arranged to sandwich the film together with the nip forming member to form a nip portion between the film and the pressing roller, wherein the film includes a conductive layer configured to generate heat in a case where an alternating current is supplied to the coil and an electric current is induced in a circumferential direction of the film by principle of induction heating, an inner layer formed on an inner circumference side of the conductive layer, and an outer layer formed on an outer circumference side of the conductive layer, wherein, in a case where the longitudinal direction is referred to as a first direction, a recording material conveyance direction at the nip portion is referred to as a second direction, and a direction orthogonal to both the first direction and the second direction is referred to as a third direction, the surface of the nip forming member includes a protruded portion that is protruded toward the pressing roller in the third direction, and the surface of the nip forming member is formed such that a curvature of the film when viewed in the first direction is maximum at a contact portion between the film and the protruded portion, wherein as seen in the first direction, a neutral axis of the film is positioned within the outer layer, and wherein the outer layer is formed of an insulator.

2. The fixing unit according to claim 1, wherein the protruded portion is positioned downstream in the second direction of a center position of the nip portion in the second direction.

3. The fixing unit according to claim 2, wherein the surface of the nip forming member includes a recess portion that is dented toward a side receding from the pressing roller in the third direction, and a second protruded portion that is protruded toward the pressing roller in the third direction, wherein the recess portion is provided downstream of the second protruded portion and upstream of the protruded portion in the second direction, and wherein a minimum value of a radius of curvature of the protruded portion when viewed in the first direction is smaller than a minimum value of a radius of curvature of the recess portion and a minimum value of the radius of curvature of the second protruded portion when viewed in the first direction.

4. The fixing unit according to claim 1, wherein a thickness of the outer layer is greater than a thickness of the inner layer.

5. The fixing unit according to claim 1, wherein a Young's modulus of the outer layer is greater than a Young's modulus of the inner layer.

6. The fixing unit according to claim 1, wherein the film further includes a surface layer that is formed on an outermost circumference side of the film, and wherein a neutral axis of the film obtained by excluding the surface layer is positioned within the outer layer.

7. The fixing unit according to claim 1, wherein the film further includes a surface layer that is formed on an outermost circumference side of the film and adjacent to an outer circumference side of the outer layer.

8. The fixing unit according to claim 1, wherein the film further includes a surface layer that is formed on an outermost circumference side of the film, and an elastic layer that is formed between the outer layer and the surface layer.

9. The fixing unit according to claim 1, wherein the inner layer is formed of an insulator.

10. The fixing unit according to claim 1, wherein the fixing unit is configured to heat an image on a recording material by the film while nipping and conveying the recording material by the film and the pressing roller at the nip portion.

11. An image forming apparatus comprising:

an image forming portion configured to form an image on a recording material; and the fixing unit according to claim 1 configured to fix the image on the recording material.

* * * * *